United States Patent
Islam et al.

(10) Patent No.: US 10,880,867 B2
(45) Date of Patent: Dec. 29, 2020

(54) SELECTING A NEW RADIO UPLINK RESOURCE TO TRANSMIT A RANDOM ACCESS PROCEDURE COMMUNICATION

(71) Applicant: QUALCOMM Incorporated, San Diego, CA (US)

(72) Inventors: Muhammad Nazmul Islam, Littleton, MA (US); Tao Luo, San Diego, CA (US); Sony Akkarakaran, Poway, CA (US); Hung Dinh Ly, San Diego, CA (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 78 days.

(21) Appl. No.: 16/192,574

(22) Filed: Nov. 15, 2018

(65) Prior Publication Data
US 2019/0159175 A1    May 23, 2019

Related U.S. Application Data

(60) Provisional application No. 62/588,007, filed on Nov. 17, 2017.

(51) Int. Cl.
*H04W 72/02* (2009.01)
*H04L 5/00* (2006.01)
(Continued)

(52) U.S. Cl.
CPC .......... *H04W 72/02* (2013.01); *H04B 7/2621* (2013.01); *H04L 5/001* (2013.01);
(Continued)

(58) Field of Classification Search
None
See application file for complete search history.

(56) References Cited

U.S. PATENT DOCUMENTS

| 2012/0106472 A1* | 5/2012 | Rosa | H04W 72/0453 370/329 |
| 2015/0215940 A1* | 7/2015 | Goldhamer | H04W 24/10 370/252 |

(Continued)

OTHER PUBLICATIONS

Huawei, et al., "On numerology determination during initial access", 3GPP Draft; R1-1717056, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340247, 2 Pages, Retrieved from the Internet: URL: http://www.3gpp.org/ftp/Meetings_3GPP_SYNC/RAN1/Docs/ [retrieved on Oct. 8, 2017], Sec.2, page 2.

(Continued)

*Primary Examiner* — Bunjob Jaroenchonwanit
(74) *Attorney, Agent, or Firm* — Loza & Loza LLP

(57) ABSTRACT

Various aspects directed towards performing a random access procedure are disclosed. In one example, a parameter is identified from a plurality of parameters, and an uplink (UL) resource associated with a random access procedure is selected based on a value associated with the parameter. A random access procedure communication is then transmitted via the selected UL resource. In another example, different parameters are supported by a scheduling entity such that each of the parameters has a corresponding plurality of different potential values. Here, the scheduling entity enables a scheduled entity to select an UL resource to perform a random access procedure based on a value corresponding to a particular one of the parameters. A random access procedure communication is then received from the scheduled entity via the UL resource.

30 Claims, 13 Drawing Sheets

(51) Int. Cl.

| | | |
|---|---|---|
| *H04W 76/10* | (2018.01) | |
| *H04B 7/26* | (2006.01) | |
| *H04W 56/00* | (2009.01) | |
| *H04W 72/04* | (2009.01) | |
| *H04W 74/08* | (2009.01) | |
| *H04W 28/18* | (2009.01) | |

(52) U.S. Cl.
CPC .......... *H04L 5/0053* (2013.01); *H04L 5/0094* (2013.01); *H04W 56/001* (2013.01); *H04W 72/048* (2013.01); *H04W 74/0833* (2013.01); *H04W 76/10* (2018.02); *H04W 28/18* (2013.01)

(56) References Cited

U.S. PATENT DOCUMENTS

| | | | | |
|---|---|---|---|---|
| 2015/0326377 | A1* | 11/2015 | Freda | H04W 72/005 370/278 |
| 2016/0014810 | A1* | 1/2016 | Tabet | H04B 7/0626 370/329 |
| 2016/0157238 | A1* | 6/2016 | Lee | H04W 52/34 370/329 |
| 2016/0165465 | A1* | 6/2016 | Park | H04W 24/00 370/331 |
| 2016/0242147 | A1* | 8/2016 | Tarlazzi | H04W 72/04 |
| 2017/0135134 | A1* | 5/2017 | Rune | H04W 74/04 |
| 2017/0303269 | A1* | 10/2017 | Kato | H04W 56/0005 |
| 2018/0139778 | A1* | 5/2018 | Chou | H04W 76/27 |
| 2018/0205516 | A1* | 7/2018 | Jung | H04L 5/0051 |
| 2018/0270866 | A1* | 9/2018 | Loehr | H04L 1/189 |
| 2018/0324865 | A1* | 11/2018 | Hui | H04B 7/088 |
| 2019/0037569 | A1* | 1/2019 | Lee | H04W 52/48 |
| 2019/0044689 | A1* | 2/2019 | Yiu | H04W 72/042 |
| 2019/0045491 | A1* | 2/2019 | Zhang | H04W 72/1289 |
| 2019/0069256 | A1* | 2/2019 | Jung | H04L 5/005 |
| 2019/0104554 | A1* | 4/2019 | Amuru | H04W 72/042 |
| 2019/0110289 | A1* | 4/2019 | Kato | H04W 56/0005 |
| 2019/0141742 | A1* | 5/2019 | Zhou | H04W 28/20 |
| 2019/0150200 | A1* | 5/2019 | Chen | H04W 74/0833 370/329 |
| 2019/0182000 | A1* | 6/2019 | Futaki | H04L 1/0693 |
| 2019/0200344 | A1* | 6/2019 | Speight | H04W 72/0413 |
| 2019/0364513 | A1* | 11/2019 | Liu | H04W 52/10 |
| 2019/0387550 | A1* | 12/2019 | Pan | H04W 74/0833 |
| 2020/0007292 | A1* | 1/2020 | Huang | H04W 72/046 |
| 2020/0029293 | A1* | 1/2020 | Zhang | H04W 56/00 |
| 2020/0037260 | A1* | 1/2020 | Fu | H04L 27/2646 |
| 2020/0037361 | A1* | 1/2020 | Chakraborty | H04L 5/0053 |
| 2020/0053786 | A1* | 2/2020 | Kim | H04W 56/0015 |
| 2020/0092864 | A1* | 3/2020 | Chen | H04W 72/042 |
| 2020/0099461 | A1* | 3/2020 | Chen | H04J 11/005 |

OTHER PUBLICATIONS

Huawei et al., "Overview of Wider Bandwidth Operations", 3GPP DRAFT; R1-1709972, 3rd Generation Partners Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017, 9 Pages, XP051299197, Retrieved from the Internet: URL:http://www.3gpp.org/ftp/Meetings_3GPP_SYNC/RAN1/Docs/ [retrieved on Jun. 26, 2017], Sec.5, p. 4-p. 5, Figure 6.

Huawei, et al: "Remaining Issues in RACH Procedure," 3GPP Draft R1-1717051, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340242, 11 pages, Retrieved from the Internet: URL: http://www.3gpp.org/ftp/Meetings_3GPP_SYNC/RAN1/Docs/ [retrieved on Oct. 8, 2017], Section 1, page 1.

International Search Report and Written Opinion—PCT/US2018/061602—ISA/EPO—dated Apr. 29, 2019.

NTT DOCOMO., et al., "Discussion on Remaining Details on PRACH Formats", 3GPP DRAFT; R1-1718183, Discussion on Remaining Details on PRACH Formats Final, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017 (Oct. 8, 2017), pp. 1-11, XP951341365, Retrieved from the Internet: URL: http://www.3gpp.org/ftp/Meetings_3GPP_SYNC/RAN1/Docs/ [retrieved on Oct. 8, 2017], Sec.5, p. 4-p. 5, Sec. 5, Page 4.

* cited by examiner

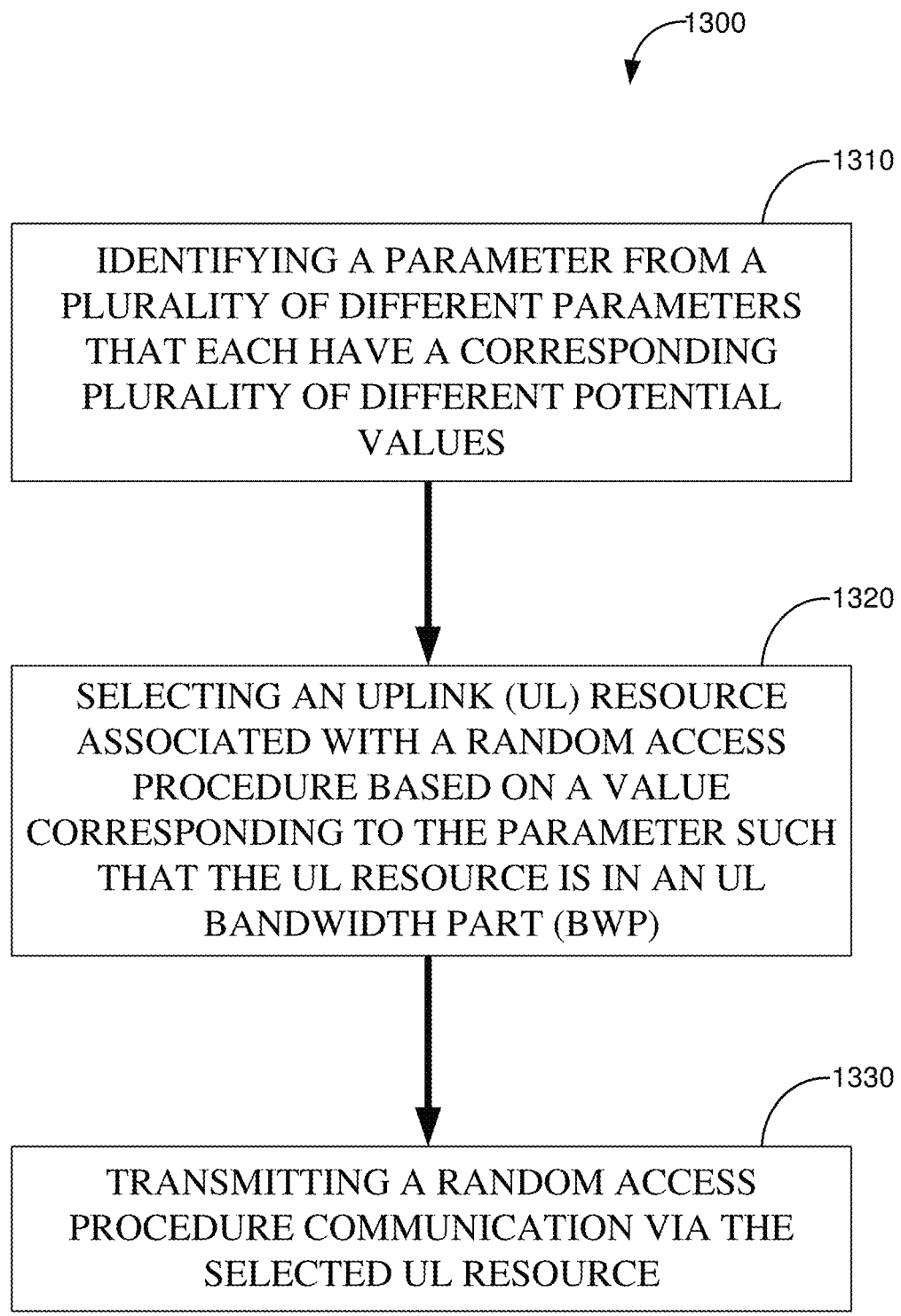

SELECTING A NEW RADIO UPLINK RESOURCE TO TRANSMIT A RANDOM ACCESS PROCEDURE COMMUNICATION

CROSS-REFERENCE TO RELATED APPLICATIONS

The application claims priority to and the benefit of U.S. provisional patent application No. 62/588,007 filed on Nov. 17, 2017, the entire content of which is incorporated herein by reference as if fully set forth below in its entirety and for all applicable purposes.

TECHNICAL FIELD

The technology discussed below relates generally to wireless communication systems, and more particularly, to selecting a 5G New Radio (NR) uplink resource to transmit a random access procedure communication.

INTRODUCTION

As the demand for mobile broadband access continues to increase, research and development continue to advance wireless communication technologies not only to meet the growing demand for mobile broadband access, but to advance and enhance the user experience with mobile communications. With the imminent deployment of 5G New Radio (NR) nodes, it is anticipated that future user equipment (UE) designs will include designs that are compatible with such NR networks. Namely, it is anticipated that future UEs will be designed so as to take advantage of the added functionality and flexibility of NR networks. With respect to random access procedure, for instance, NR networks will support both single active and multiple initial uplink (UL) bandwidth part (BWP) functionality. Accordingly, it would be desirable to provide a UE design compatible with such single active and multiple initial UL BWP functionality.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduled entity (e.g., a user equipment (UE)) are disclosed. In a particular example, a method is disclosed for selecting which uplink (UL) resources to utilize for transmitting a random access procedure communication. The method includes identifying a parameter from a plurality of different parameters in which each of the plurality of different parameters has a corresponding plurality of different potential values. The method also includes selecting an UL resource associated with a random access procedure based on a value corresponding to the parameter whereby the UL resource is in an UL bandwidth part (BWP). The method further includes transmitting a random access procedure communication via the selected UL resource.

In another aspect, a scheduled entity is disclosed. The scheduled entity can include a processor communicatively coupled to each of an identification circuitry, a selection circuitry, and a communication circuitry. For this example, the identification circuitry can be configured to identify a parameter from a plurality of different parameters in which each of the plurality of different parameters has a corresponding plurality of different potential values. The selection circuitry can be configured to select an UL resource associated with a random access procedure based on a value corresponding to the parameter such that the UL resource is in an UL BWP. The communication circuitry can be configured to transmit a random access procedure communication via the selected UL resource.

Various aspects directed towards a scheduling entity (e.g., a base station) are also disclosed. In a particular example, a method is disclosed for facilitating a random access procedure performed by a scheduled entity. The method includes supporting a plurality of different parameters in which each of the plurality of different parameters has a corresponding plurality of different potential values, and enabling at least one scheduled entity to select an UL resource to perform a random access procedure. In this example, the UL resource is based on a value corresponding to a particular one of the plurality of different parameters in which the UL resource is in an UL BWP. The method further includes receiving a random access procedure communication from the at least one scheduled entity via the UL resource.

In another aspect, a scheduling entity is disclosed. A scheduling entity can include a processor communicatively coupled to each of a parameter circuitry, an enabling circuitry, and a communication circuitry. For this example, the parameter circuitry can be configured to support a plurality of different parameters in which each of the plurality of different parameters has a corresponding plurality of different potential values. The enabling circuitry can be configured to enable at least one scheduled entity to select an UL resource to perform a random access procedure. In this example, the UL resource is based on a value corresponding to a particular one of the plurality of different parameters in which the UL resource is in an UL BWP. The communication circuitry can be configured to receive a random access procedure communication from the at least one scheduled entity via the UL resource.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 13 is a flow chart illustrating an exemplary scheduled entity process for performing a random access procedure according to some aspects of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure are directed towards selecting a 5G New Radio (NR) uplink (UL) resource to transmit a random access procedure communication. In a particular implementation, it is contemplated that a user equipment (UE) may be configured to select such UL resources according to a particular value corresponding to one of a plurality of parameters (e.g., random access procedure parameters). In order to facilitate such implementation, it is further contemplated that aspects of a 5G NR network (e.g., a base station) may be configured to support a plurality of different parameters (e.g., random access procedure parameters) in which each of the plurality of different parameters has a corresponding plurality of different potential values.

Figure 1:
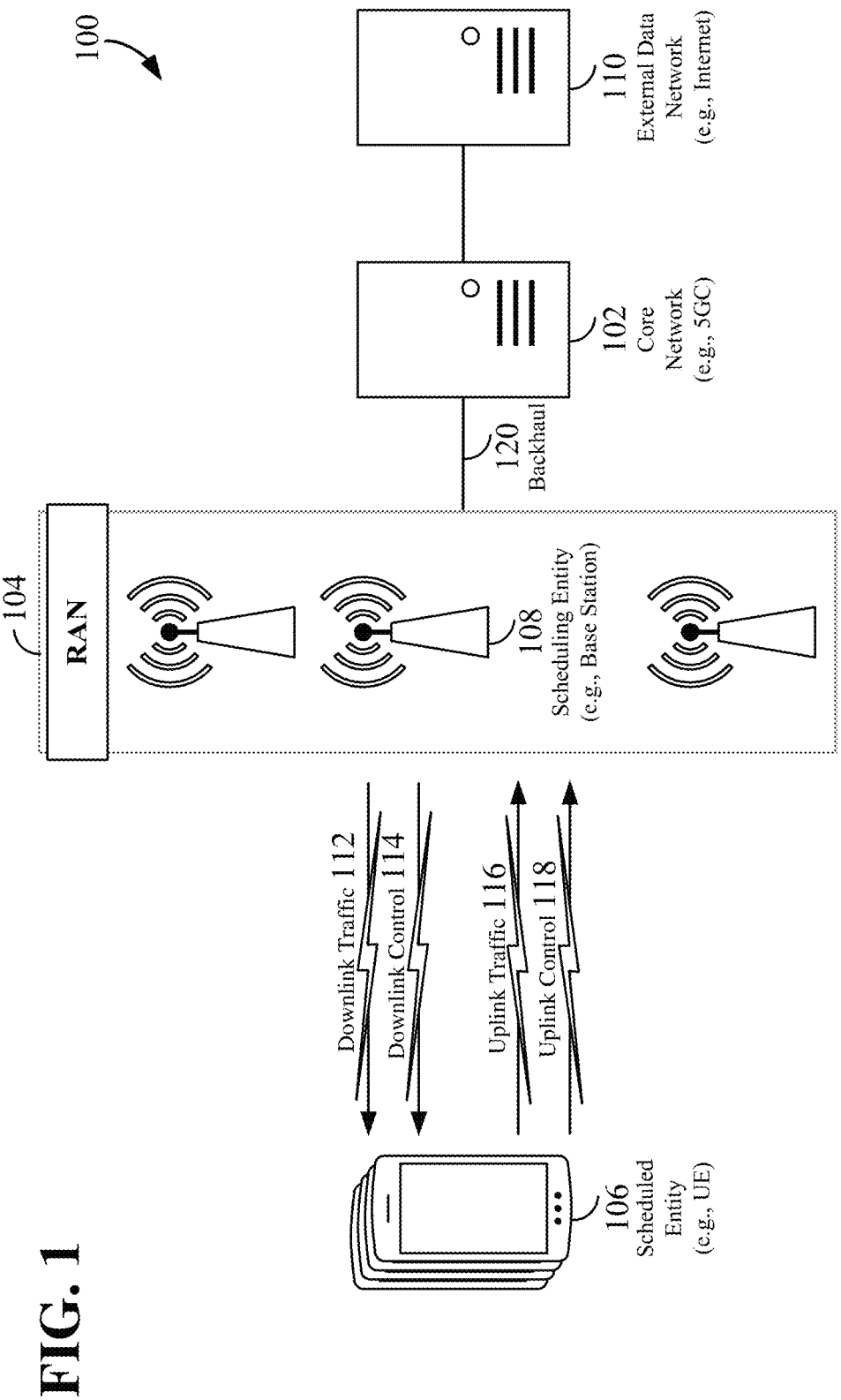
FIG. 1 is a schematic illustration of a wireless communication system according to some embodiments.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a UE 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) NR specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards. And in some cases, a mobile apparatus may also be referred as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE can be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. A a scheduling entity (e.g., a base station 108) can allocate resources for communication among some or all devices and equipment within its service area or cell. Within the present disclosure and in some scenarios, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., a 5G Core Network designed to support throughput, latency, and mobility requirements of different service categories with the introduction of a Services Based Architecture (SBA) and Control and User Plane Separation (CUPS)). In other examples, the core network 102 may be configured according to a 4G evolved packet core (EPC), or any other suitable standard or configuration.

Figure 2:
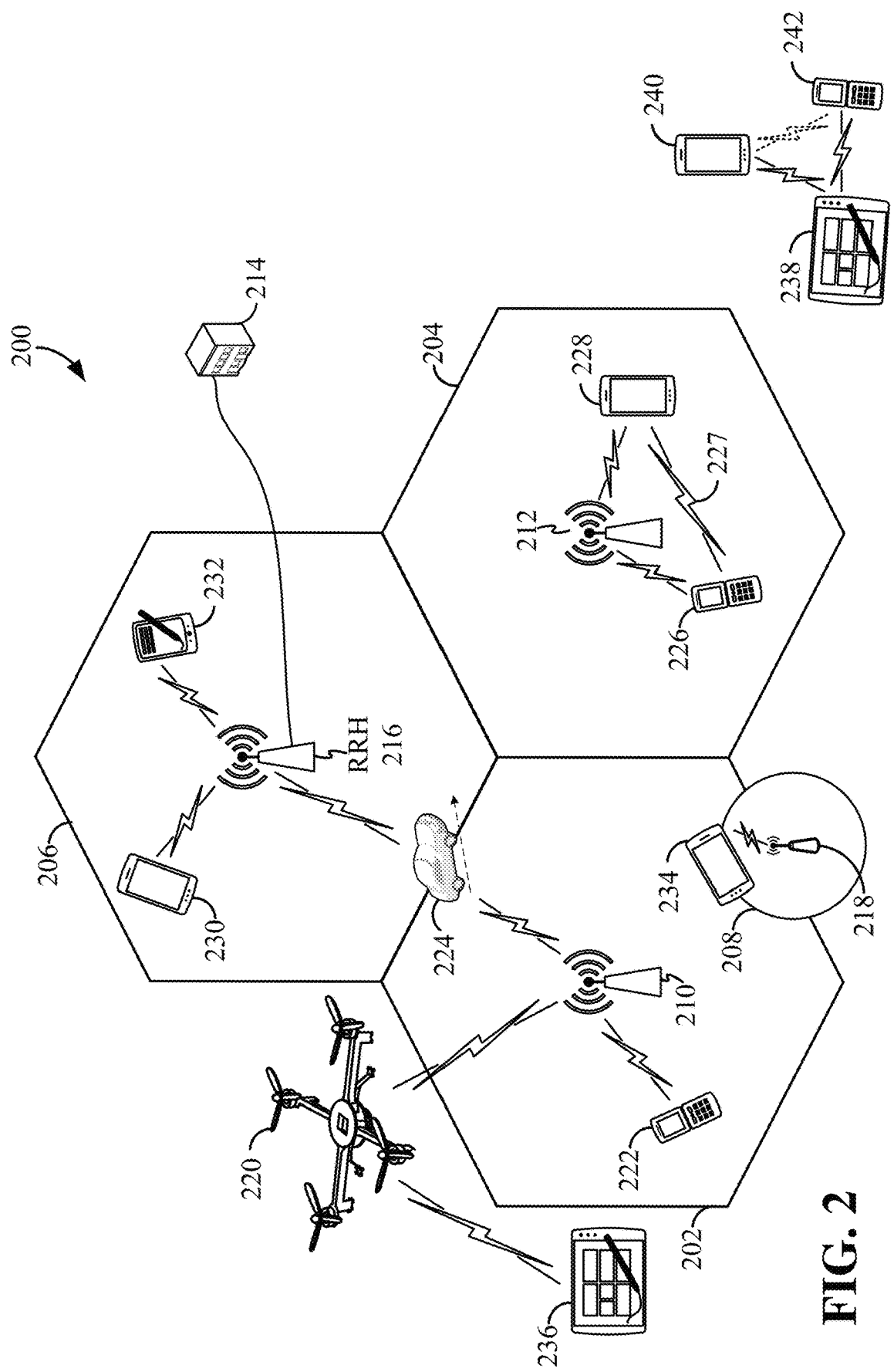
FIG. 2 is a conceptual illustration of an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The radio access network 200 may include any number of wireless base stations, nodes, and cells. As one example, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220. Though not shown, the drone 220 may also be other types of vehicles, including but not limited to, high altitude crafts, aerial-based vehicles, land-based vehicles, or water-going vehicles.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1). Mobility features may also include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
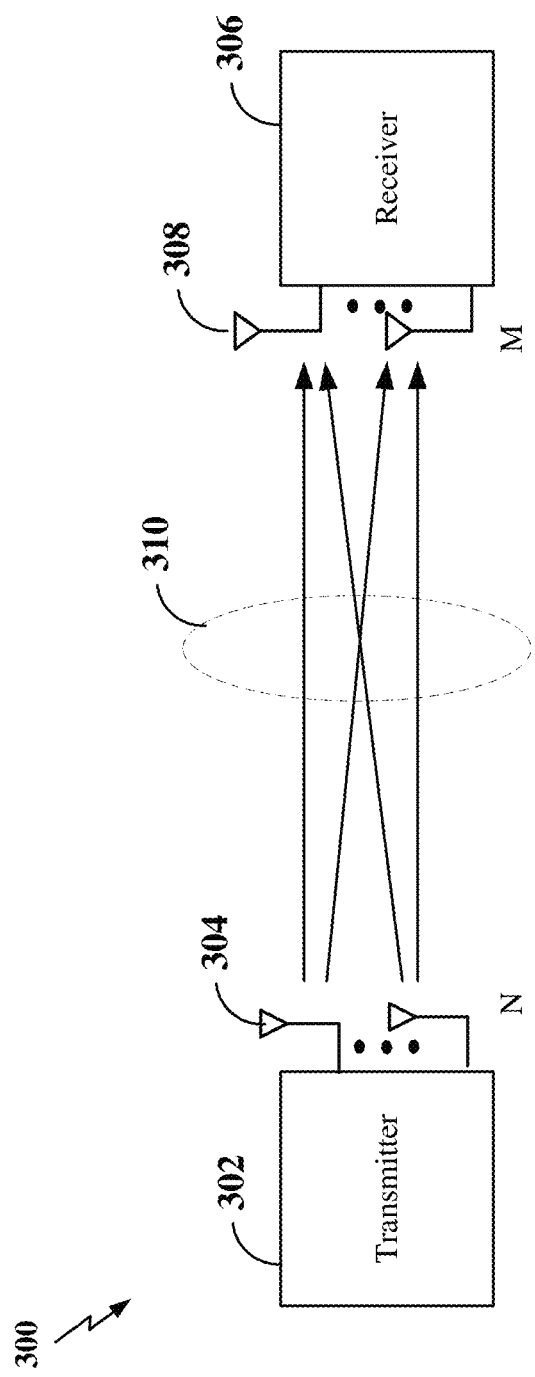
FIG. 3 is a block diagram illustrating a wireless communication system supporting multiple-input multiple-output (MIMO) communication according to some embodiments.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

According to 5G NR specifications, user data is coded using quasi-cyclic low-density parity check (LDPC) with two different base graphs. One base graph can be used for large code blocks and/or high code rates, and another base graph can be used otherwise. Of course, other use cases may be implemented with differing types of base graph combinations. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame generally refers to a logical segment of transmission of a particular time interval. As one example configuration, a frame can refer to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time—frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
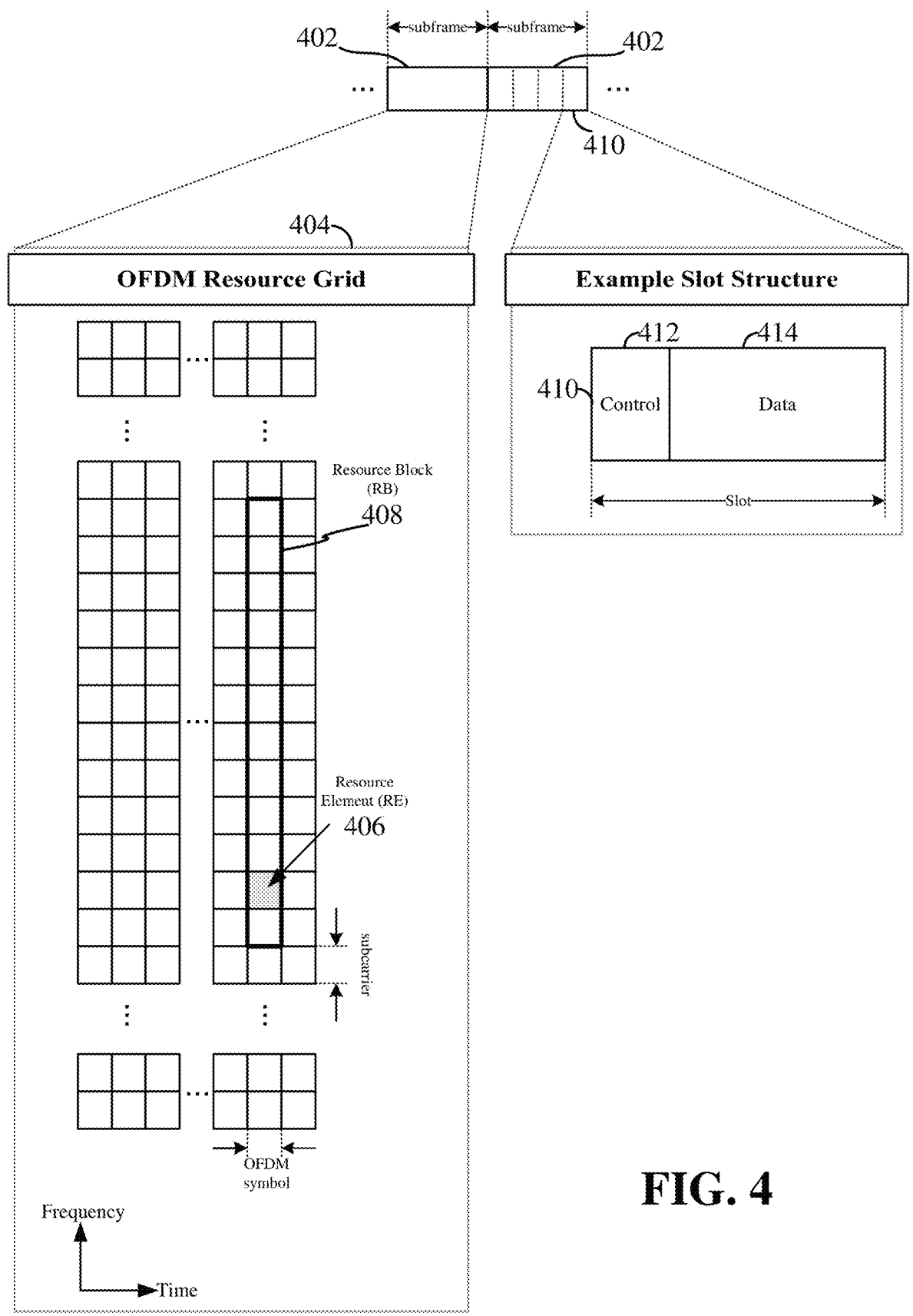
FIG. 4 is a schematic illustration of an organization of wireless resources in an air interface utilizing orthogonal frequency divisional multiplexing (OFDM) according to some embodiments.

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. This data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Exemplary Implementations

As previously stated with respect to a random access procedure, it is anticipated that 5G New Radio (NR) networks will support both single active and multiple initial uplink (UL) bandwidth part (BWP) functionality. Here, it should be appreciated that a BWP is generally defined as a subset of contiguous resource blocks (RBs) on a carrier. In some scenarios, although only one active UL BWP might be supported, it should be appreciated that multiple frequency division multiplexed random access transmission occasions might be supported. Accordingly, aspects disclosed herein are directed towards facilitating a selection of random access procedure UL resources in which the network supports multiple initial UL BWPs, as well as a single active UL BWP configuration where there may be multiple frequency division multiplexed random access transmission occasions. In a particular aspect, it is contemplated that such UL resources are selected by a user equipment (UE) within an NR network that supports different potential values for different parameters (e.g., number of supported preambles, PRACH format, power ramping counter, backoff counter, maximum number of preamble transmissions, PRACH received target power, SSblockRSRPthreshold, etc.) across these multiple initial UL BWPs and/or multiple frequency division multiplexed random access transmission occasions. This desirably allows the network to provide different incentives for a UE to access these different active UL BWPs and/or frequency division multiplexed random access transmission occasions. In some scenarios, it is also contemplated that there could be one downlink (DL), but multiple supplemental UL (SUL) channels (each with a different carrier frequency, e.g.), which may be desirable if the UL load is high, wherein the parameters could be different for different SULs.

For reference purposes, several exemplary scenarios are contemplated and disclosed herein. In a first exemplary scenario, the numerology of the initial active UL BWP is the same as the numerology of the message 3 Physical Uplink Shared Channel (PUSCH) configured in the remaining minimum system information (RMSI). In this scenario, for a paired spectrum, the frequency position of the initial active UL BWP can be configured in RMSI. For an unpaired spectrum, the initial active downlink (DL) and initial active UL BWP may share the same center frequency. For SUL bands, the frequency position of the initial active UL BWP can be configured in RMSI. Also, for this scenario, the bandwidth of the initial active UL BWP can be configured in RMSI.

In a second exemplary scenario, a UE minimum transmission bandwidth is defined as the largest bandwidth that all UEs must support regardless of UE capability (NOTE: it is anticipated that the UE minimum transmission bandwidth will ultimately be determined by RAN4). Also, for this scenario, the bandwidth of the initial active UL BWP is equal to or narrower than the UE minimum transmission bandwidth.

In a third exemplary scenario, it is noted that the frequency division multiplexed random access transmission occasions configured by RMSI may or may not be confined within the initial active UL BWP. Here, the transmission of PUSCH for message 3 and the transmission of Physical Uplink Control Channel (PUCCH) for message 4 HARQ feedback are confined within the initial active UL BWP.

In a fourth exemplary scenario, from the UE's perspective, at least a single initial active UL BWP is supported and configured per cell-defining Synchronization Signal Block (SSB). When SUL is configured, an additional initial active UL BWP for SUL can be independently configured.

Figure 5:
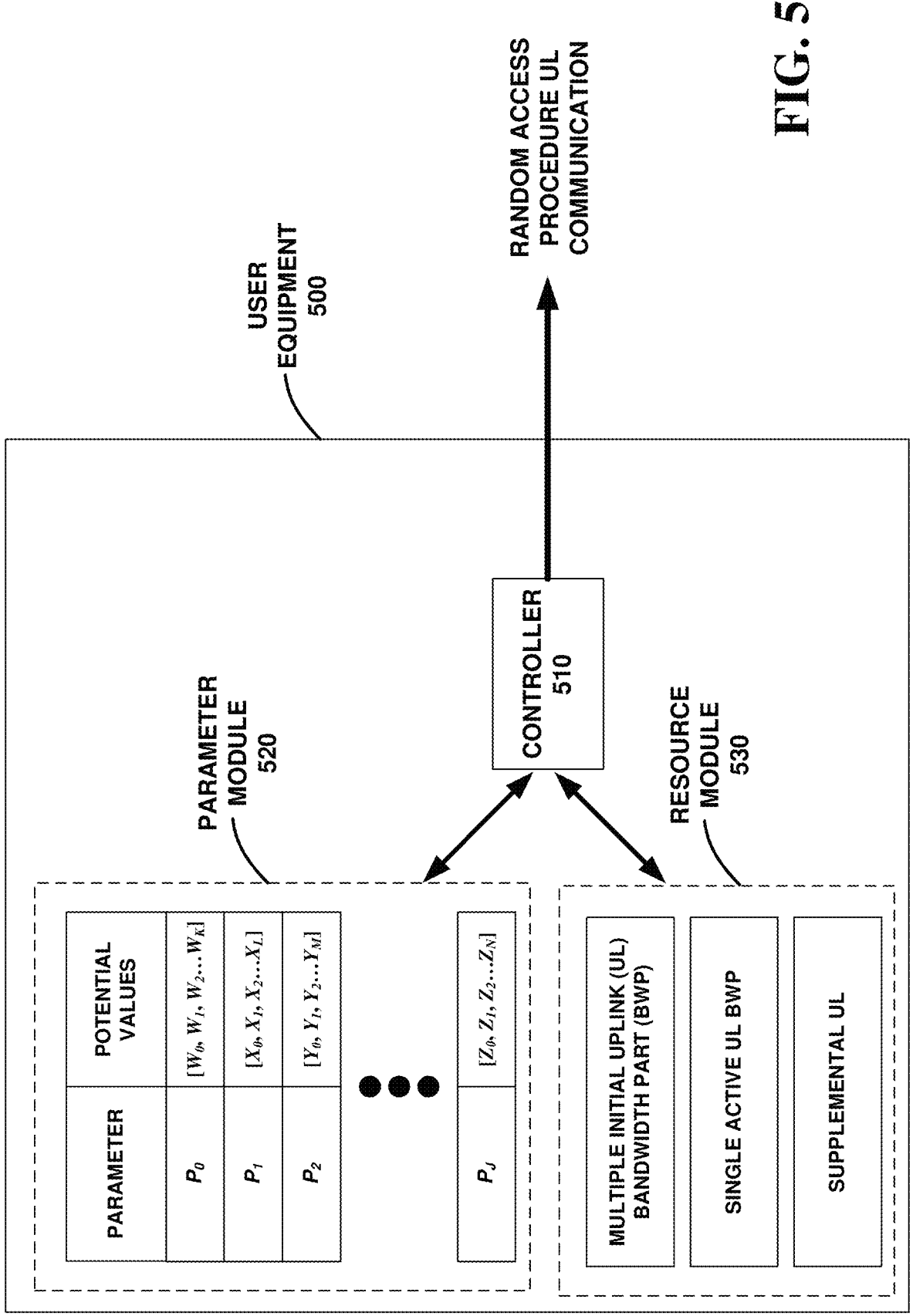
FIG. 5 is a block diagram illustrating an exemplary user equipment (UE) according to some embodiments.

Referring next to FIG. 5, a block diagram illustrating an exemplary UE according to some embodiments is provided. As illustrated, it is contemplated that a UE 500 may include a controller 510 coupled to each of a parameter module 520 and a resource module 530. For this particular example, it is contemplated that the controller 510 may be configured to transmit a random access procedure communication via a UL resource selected from the resource module 530. Namely, it is contemplated that the controller 510 may be configured to select a particular UL resource from the resource module 530 based on a value corresponding to a particular parameter listed in the parameter module 520. As illustrated, it should be appreciated that any of a plurality of parameters (i.e., $P_0, P_1, P_2, \ldots P_J$) are contemplated in which each of the plurality of different parameters has a corresponding plurality of different potential values. For instance, such parameters may include, but are not limited to, a preamble format, a number of preambles, a backoff indicator, a power ramping counter, a physical random access channel (PRACH) received target power, a maximum number of PRACH transmissions, or a reference signal received power (RSRP) threshold.

Figure 6:
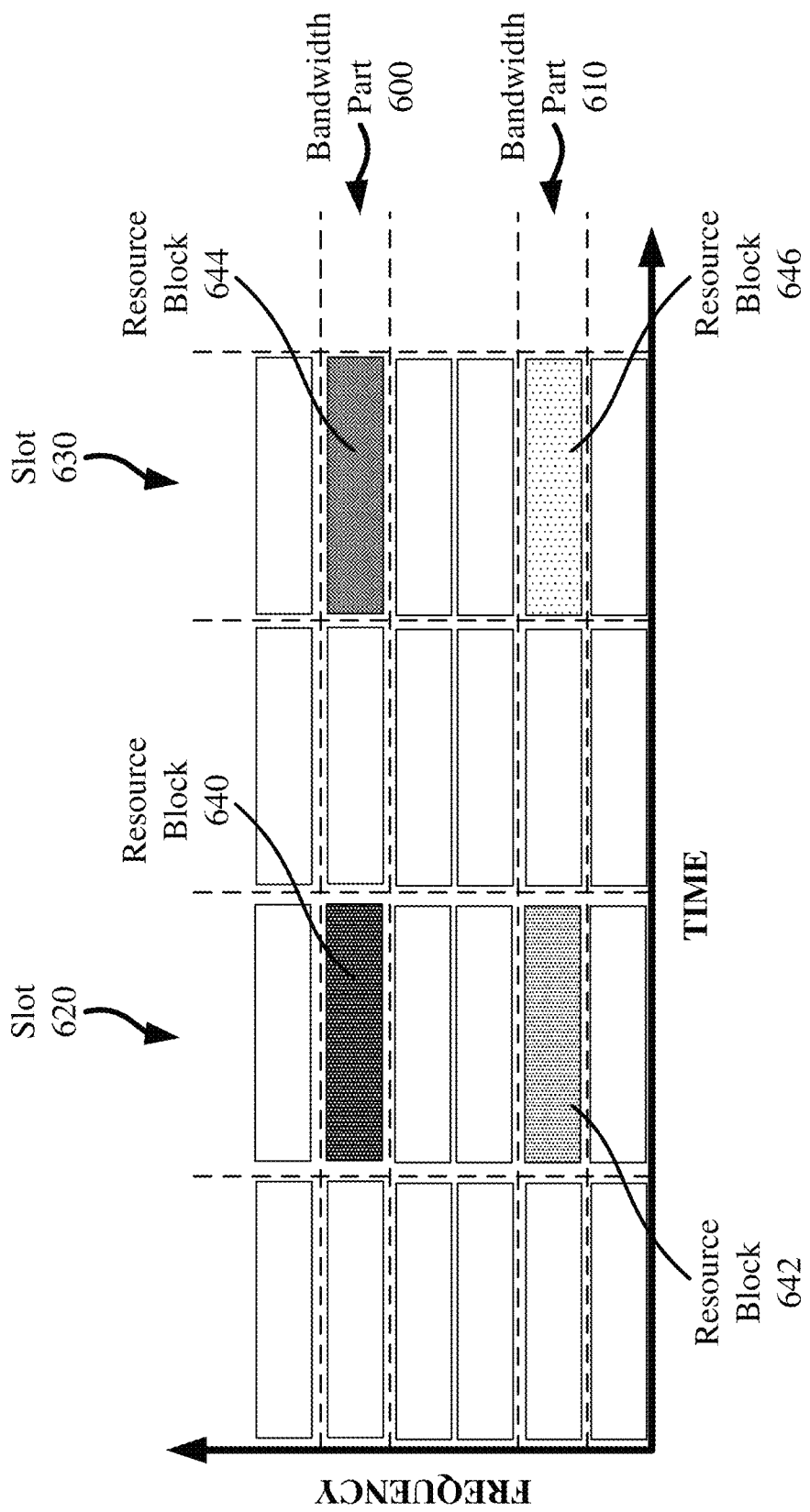
FIG. 6 illustrates an exemplary multiple initial uplink (UL) bandwidth part (BWP) configuration in accordance with an aspect of the specification.

Referring next to FIG. 6, an exemplary multiple initial UL BWP configuration is provided in accordance with an aspect of the specification. As illustrated, such configuration includes a first BWP 600 and a second BWP 610, as well as slot 620 and slot 630. For this particular example, it is contemplated that a random access procedure performed by a UE (e.g., UE 500) may comprise transmitting an initial communication to a network (e.g., message 1) within slot 620 either via resource block 640 or 642, wherein resource block 640 is transmitted within BWP 600 and resource block 642 is transmitted via BWP 610. As illustrated, it is further contemplated that the UE may transmit a subsequent communication to the network (e.g., message 3) within slot 630 either via resource block 644 or 646, wherein resource block 644 is transmitted within BWP 600 (e.g., with 60K SCS) and resource block 646 is transmitted via BWP 610 (e.g., with 120K SCS).

Figure 7:
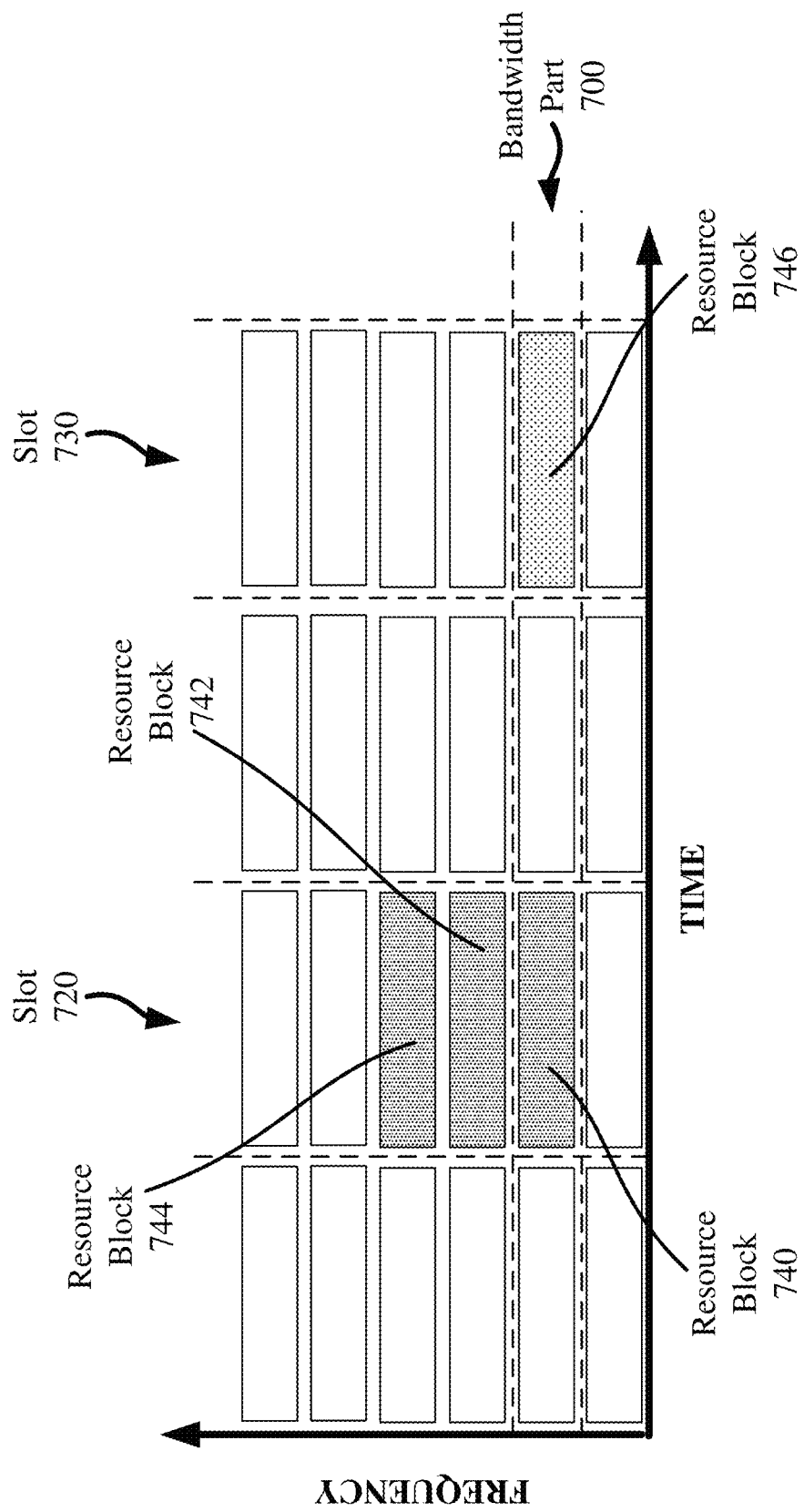
FIG. 7 illustrates an exemplary single active UL BWP configuration in accordance with an aspect of the specification.

Referring next to FIG. 7, an exemplary single active UL BWP configuration is provided in accordance with an aspect of the specification. As illustrated, such configuration includes a single BWP 700, as well as slot 720 and slot 730. For this particular example, as previously stated with respect to a single active UL BWP configuration, it is contemplated that multiple frequency division multiplexed random access transmission occasions (ROs) might be supported. Namely, it is contemplated that a random access procedure performed by a UE (e.g., UE 500) may comprise transmitting an initial communication to a network (e.g., message 1) within slot 720 either via resource block 740, 742, or 744, wherein resource block 740 is a random access transmission occasion transmitted within BWP 700, and wherein resource blocks 742 and 744 are random access transmission occasions transmitted outside of BWP 700. As illustrated, it is further contemplated that the UE may transmit a subsequent communication to the network (e.g., message 3) within slot 730 via resource block 746, wherein resource block 746 is transmitted within BWP 700 (e.g., with 120K SCS).

Here, it should be noted that, since resource blocks 742 and 744 are random access transmission occasions transmitted outside of BWP 700, the UE may prefer to transmit the initial communication to the network (e.g., message 1) only through the RO that lies within the UL BWP.

If there is only one active UL BWP and if some ROs fall outside the bandwidth of the UL BWP, it should be noted that the UE may prefer to transmit the initial communication to the network (e.g., message 1) only through resource block 740 (i.e., the random access transmission occasion transmitted within BWP 700), since that would ensure that the UE will not have to switch its bandwidth between messages 1 and 3. Accordingly, as contemplated and disclosed herein, it would be desirable for the network to provide incentives for UEs to select random access transmission occasions that fall outside the active UL BWP. Such incentives may be provided by allowing the UE to select a resource block for transmitting an initial random access procedure communication (e.g., message 1) based on different values corresponding to different parameters (e.g., random access procedure parameters).

As disclosed herein, it should be appreciated that different values corresponding to any of various parameters are contemplated including, for example: longer preamble formats can be allowed in those random access transmission occasions to increase link budget; higher number of preambles per random access transmission occasion can be allocated in those random access transmission occasions to reduce RACH collision (NOTE: as will be discussed further below, this may impact SSB→RO/RACH preamble mapping as well); backoff indicator can be reduced to speed up retransmission frequency; power ramping counter can be higher so that the UE can ramp up UL transmission power quickly; PRACH received target power and maximum number of PRACH transmissions can be different; RSRPthreshold for SS block can be smaller so that UEs are free to select SS blocks with weaker signal strength if they transmit in those random access transmission occasions. Several other parameters can be different as well, including, for example, each of the following which have corresponding definitions/descriptions in 3GPP TS 36.331 V14.3.0 (2017-06) and is hereby incorporated by reference in its entirety:

High speed flag: Parameter: High-speed-flag, see TS 36.211 [21, 5.7.2]. TRUE corresponds to Restricted set and FALSE to Unrestricted set.

Prach-ConfigIndex: Configuration index of PRACH. Denotes the time-frequency locations of PRACH resources.
Range of values: [{0, 1, . . . , 255}]

RootSequenceIndex: Parameter: RACH_ROOT_SEQUENCE, see TS 36.211 [21, 5.7.1].
Range of values:
    For long sequence: {0, 1, . . . , 837}
    For short sequence: {0, 1, . . . , 137}

RSRP-ThresholdSSBlock: RSRP threshold for the selected SS block.

RSRP-ThresholdSUL: RSRP threshold if UE selects a SUL for transmitting RACH.

ZeroCorrelationZoneConfig: Used to find the cyclic shift of Msg1 transmission.
Range of values: {0, 1, . . . , 15}

Msg3Waveform: Msg3 waveform. Can be DFT-S-OFDM or CP-OFDM.
Range of values: {0, 1}
    Note: Index 0 and 1 refer to CP-OFDM and DFT-s-OFDM respectively PreambleInitialReceivedTargetPower: Target received power for Msg1.

Parameters related to mapping between SSB and PRACH transmission occasions and preambles Parameters related to the mapping between CSI-RS and PRACH transmission occasions and preambles
    prach-Msg1SequenceLength
    Range of values: {139,839}prach-Msg1SubcarrierSpacing
    Range of values: {15, 30} or {60, 120} kHz
        Note: SCS is only needed for the short sequence. The long sequence SCS is determined by the preamble format.
    prach-StartingSymbolIndex
    Range of values: {0, 2}
    prach-EndSymbolIndex
    Range of values: {11, 12, 13}
    prach-PreambleFormat
    Range of values for long sequence: {0, 1, 2, 3}
    Range of values for short sequence: {A1/B1, A2/B2, A3/B3, B4, C0, C1, [A0, A1, A2, A3, B1]}
        Note: Formats A0, A1, A2, A3 are currently FFS
        Note: One proponent prefers to support format B1 prach-FreqOffset: Starting position of UL BWP and/or RACH occasion

Note: parameters should be decided after initial active UL BWP discussion ra-PreambleIndexConfig Masks for RACH resources and/or SSBs Number of PRACH transmission occasions FDMed in one time instance Note: Parameters may be decided after initial active UL BWP Msg3 tone spacing Note: Decision may depend on initial active UL BWP zeroCorrelationZoneConfigDedicated: Used to find cyclic shift for contention free RACH (CFRA)

RootSequenceIndexDedicated: Used to find root sequence for CFRA.

ra-ResponseWindowSize: Duration of the RA response window in TS 36.321 [6]. Value in subframes. Value sf2 corresponds to 2 subframes, sf3 corresponds to 3 subframes and so on. The same value applies for each serving cell (although the associated functionality is performed independently for each cell).

RACH CORESET configuration prach-ConfigIndexDedicated connEstFailCount: Number of times that the UE detects T300 expiry on the same cell before applying connEstFailOffset connEstFailOffsetValidity: Amount of time that the UE applies connEstFailOffset before removing the offset from evaluation of the cell. Value s30 corresponds to 30 seconds, s60 corresponds to 60 seconds, and so on connEstFailOffset: Parameter "Qoffset$_{temp}$" in TS 36.304 [4]. If the field is not present the value of infinity shall be used for "Qoffset$_{temp}$".

mac-ContentionResolutionTimer: Timer for contention resolution in TS 36.321 [6]. Value in PDCCH periods. Value pp1 corresponds to 1 PDCCH period, pp2 corresponds to 2 PDCCH periods and so on. The value considered by the UE is: mac-ContentionResolutionTimer=Min (signaled value× PDCCH period, 10.24 s).

powerRampingStep: Power ramping step during RACH retransmission.

ra-ResponseWindowSize: Duration of the RA response window in TS 36.321 [6]. Value in PDCCH periods. Value pp2 corresponds to 2 PDDCH periods, pp3 corresponds to 3 PDCCH periods and so on. The value considered by the UE is: ra-ResponseWindowSize=Min (signaled value×PDCCH period, 10.24s).

PreambleTransMax: Maximum number of preamble transmission in TS 36.321 [6]. Value is an integer.

sizeOfRA-PreamblesGroupA: Size of the random access preambles group A in TS 36.321 [6]. Value is an integer. Value n4 corresponds to 4, n8 corresponds to 8 and so on.

messageSizeGroupA: Threshold for preamble selection in TS 36.321 [6]. Value in bits. Value b56 corresponds to 56 bits, b144 corresponds to 144 bits and so on.

messagePowerOffsetGroupB: Threshold for preamble selection in TS 36.321 [6]. Value in dB. Value minusinfinity corresponds to—infinity. Value dB 0 corresponds to 0 dB, dB 5 corresponds to 5 dB and so on.

Additional aspects are also contemplated. For instance, because different active UL BWPs may attract a different number of UEs, it is contemplated that more UEs may support one tone spacing over the other. It is also noted that a network may want to load balance across different active BWPs and provide different parameters. To this end, it is contemplated that multiple UL BWPs can be grouped together (e.g., parameters in a group can be the same, but can be different across different groups).

Several aspects related to handover scenarios are also contemplated. For instance, in LTE, the UE is provided with prach-MaskIndex and prach-PreambleIndex during handover, wherein the prach-MaskIndex tells the UE where to transmit message 1 of a contention free random access within the subframe, and wherein the UE is free to select any frequency division multiplexed random access transmission occasions to transmit message 1. As disclosed herein, it is contemplated that the network can assign prach-MaskIndex for a subset of frequency division multiplexed random access transmission occasions, and that the remaining subset can be reserved by the network (e.g., to use for contention based random access or for CFRA for other UEs or for some other purposes).

In another aspect of the disclosure, it is contemplated that the network may prioritize some classes of UEs over others. For instance, the network can signal that some initial UL BWPs and/or some frequency division multiplexed random access transmission occasions are barred for a subset of UE classes (e.g., eMTC, nb-IoT, etc.).

In yet another aspect of the disclosure, it is contemplated that different parameters for different UL BWPs and/or frequency division multiplexed random access transmission occasions can be signaled any of various ways. For instance, they may be signaled through one or more combinations of: PBCH; Remaining minimum system information; Random access response; Other system information; Dedicated RRC signaling; Handover message; etc.

With respect to SSB to RO/RACH Preamble mapping, it should be noted that, if N random access transmission occasions are frequency division multiplexed, there could be different associations between the random access transmission occasions and SSB. For instance, at least three options are contemplated for one SSB to one random access transmission occasion mapping. In a first option, all N frequency division multiplexed occasions correspond to an SSB. In a second option, N frequency division multiplexed occasions correspond to N SSBs. And in a third option, N frequency division multiplexed occasions are grouped into K occasion groups (K<N) and a group corresponds to an SSB. A similar approach can be applied to the mapping of multiple SSBs to one random access transmission occasion.

Exemplary Scheduling Entity

Figure 8:
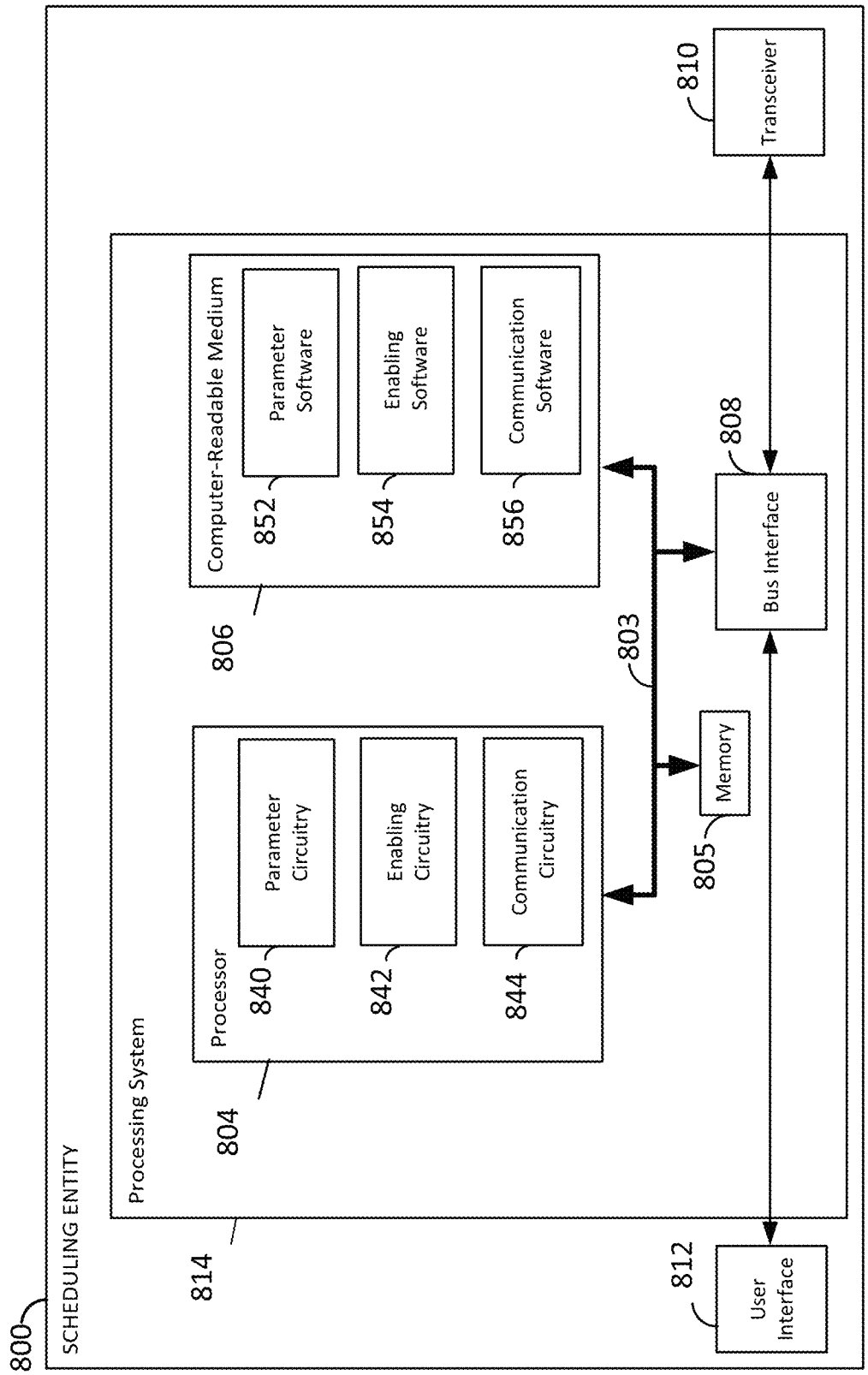
FIG. 8 is a block diagram illustrating an example of a hardware implementation for a scheduling entity employing a processing system in accordance with aspects disclosed herein.
Figure 9:
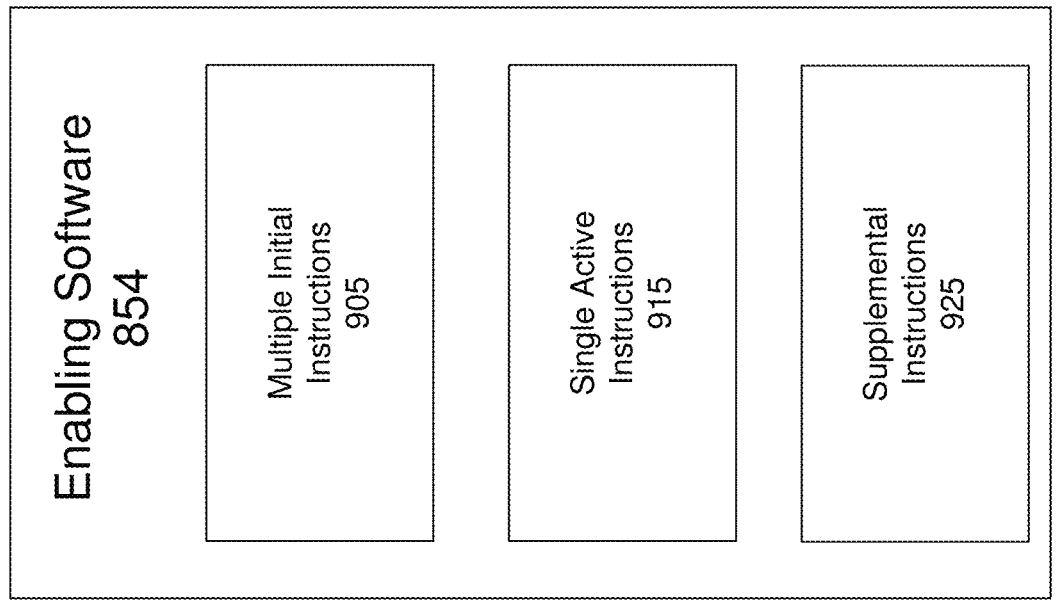
FIG. 9 is a block diagram illustrating exemplary subcomponents corresponding to the scheduling entity illustrated in FIG. 8.
Figure 9:
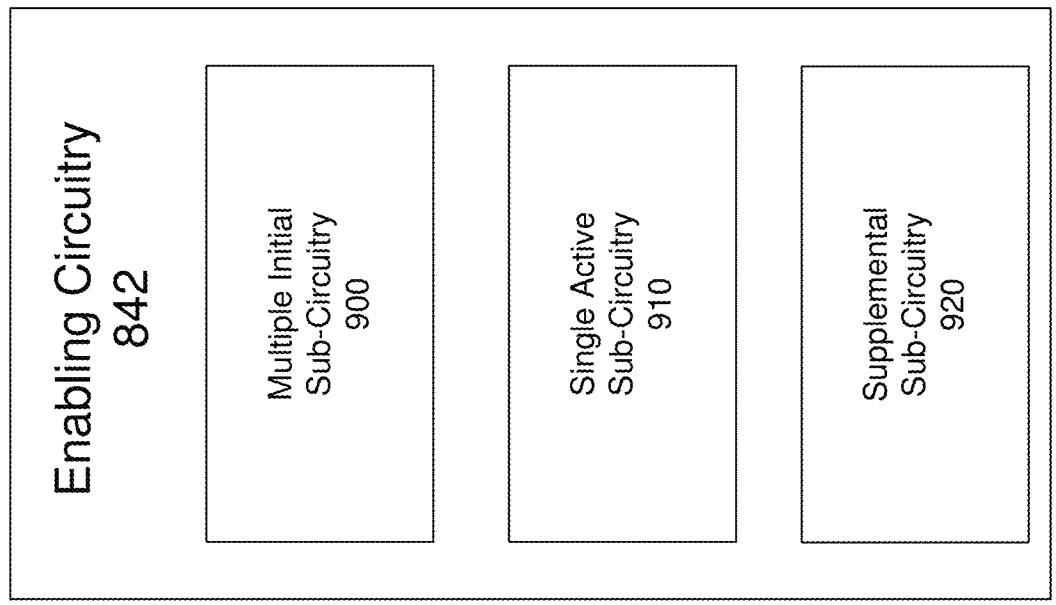

FIG. 8 is a block diagram illustrating an example of a hardware implementation for a scheduling entity 800 employing a processing system 814. For example, the scheduling entity 800 may be a user equipment (UE) as illustrated in any one or more of the FIGS. disclosed herein. In another example, the scheduling entity 800 may be a base station as also illustrated in any one or more of the FIGS. disclosed herein.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below and illustrated in FIG. 10.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include a parameter circuitry 840 configured for various functions, including, for example, to support a plurality of different parameters (e.g., a random access procedure parameter) such that each of the plurality of different parameters has a corresponding plurality of different potential values. As illustrated, the processor 804 may also include an enabling circuitry 842 configured for various functions. For instance, the enabling circuitry 842 may be configured to enable at least one scheduled entity (e.g., scheduled entity 1100) to select an uplink (UL) resource to perform a random access procedure based on a value corresponding to a particular one of the plurality of different parameters (e.g., where the enabling circuitry 842 is configured to identify the particular one of the plurality of different parameters to the at least one scheduled entity). Here, it is contemplated that the UL resource is in an UL bandwidth part (BWP). The processor 804 may further include communication circuitry 844 configured for various functions, including, for example, to receive a random access procedure communication from the at least one scheduled entity via the UL resource. Here, it should be appreciated that such random access procedure communication may either be an initial random access procedure communication, or a non-initial random access procedure communication (e.g., a connected mode contention-based or contention-free RACH). It should be further appreciated that, the combination of the parameter circuitry 840, the enabling circuitry 842, and the communication circuitry 844 may be configured to implement one or more of the functions described herein.

In an aspect of the disclosure, it is contemplated that the particular one of the plurality of different parameters may be a random access procedure parameter, such as a Message 1 parameter associated with transmitting a physical random access channel (PRACH) preamble. For instance, such parameter may be a preamble format, a number of preambles, a backoff indicator, a power ramping counter, a PRACH received target power, a maximum number of PRACH transmissions, or a reference signal received power (RSRP) threshold.

In addition to Message 1 parameters, however, it should be appreciated that the parameter circuitry 840 may be configured to support any of various other types of parameters as well. For instance, it is contemplated that the particular one of the plurality of different parameters may be a Message 3 parameter associated with establishing a radio resource control (RRC) connection.

In a further aspect of the disclosure, it is contemplated that the UL resource selected by the at least one scheduled entity (e.g., scheduled entity 1100) may be any of various types of UL BWPs. For instance, in a first exemplary embodiment, the enabling circuitry 842 may be configured to enable a scheduled entity to select between either an initial UL BWP or an active UL BWP as the BWP for the UL resource (e.g., wherein a Message 3 parameter facilitates the selecting between the initial UL BWP the active UL BWP, and wherein the Message 3 parameter denotes at least one of a cyclic prefix or a subcarrier spacing associated with a Message 3 communication). In another exemplary embodiment, however, the enabling circuitry 842 may be configured to enable scheduled entities to select between either a supplemental UL BWP or a non-supplemental UL BWP as the BWP for the UL resource (e.g., wherein a reference signal received power (RSRP) threshold corresponding to a Synchronization Signal Block (SSB) facilitates the selecting between the supplemental UL BWP and the non-supplemental UL BWP).

Various other aspects for scheduling entity 800 are also contemplated. For instance, the parameter circuitry 840 may be configured to support the different values of the plurality of different parameters in various ways. In a first example, such supporting comprises grouping a first UL BWP according to a first set of parameters, and grouping a second UL BWP according to a second set of parameters different from the first set of parameters. In a second example, such supporting comprises assigning a PRACH mask index to a subset of a plurality of frequency division multiplexed random access transmission occasions, and reserving a remainder of the plurality of frequency division multiplexed random access transmission occasions for the network.

In another aspect of the disclosure, embodiments are contemplated in which the scheduling entity 800 may prioritize some classes of scheduled entities over others. For instance, the enabling circuitry 842 may be configured to bar at least one type of scheduled entity (e.g., eMTC, nb-IoT, etc.) from utilizing at least one initial UL BWP in a multiple initial UL BWP configuration. The enabling circuitry 842 may also be configured to bar at least one type of scheduled entity (e.g., eMTC, nb-IoT, etc.) from utilizing at least one random access transmission occasion in a single active UL BWP configuration. Referring back to the remaining components of scheduling entity 800, it should be appreciated that the processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include parameter software 852 configured for various functions, including, for example, to support a plurality of different parameters such that each of the plurality of different parameters has a corresponding plurality of different potential values. As illustrated, the computer-readable storage medium 806 may also include enabling software 854 configured for various functions. For instance, the enabling software 854 may be configured to enable at least one scheduled entity to select an UL resource to perform a random access procedure based on a value corresponding to a particular one of the plurality of different parameters. Here, it is contemplated that the UL resource is in an UL BWP. The computer-readable storage medium 806 may further include communication software 856 configured for various functions, including, for example, to receive a random access procedure communication from the at least one scheduled entity via the UL resource. Here, it should be appreciated that such random access procedure communication may either be an initial random access procedure communication, or a non-initial random access procedure communication (e.g., a connected mode contention-based or contention-free RACH).

In a particular configuration, it is also contemplated that the scheduling entity 800 includes means for supporting a plurality of different parameters; means for enabling at least one scheduled entity to select an UL resource to perform a random access procedure; and means for receiving a random access procedure communication from the at least one scheduled entity via the UL resource. In one aspect, the aforementioned means may be the processor(s) 804 configured to perform the functions recited by the aforementioned means. In another aspect, the aforementioned means may be a circuit or any apparatus configured to perform the functions recited by the aforementioned means.

Figure 10:
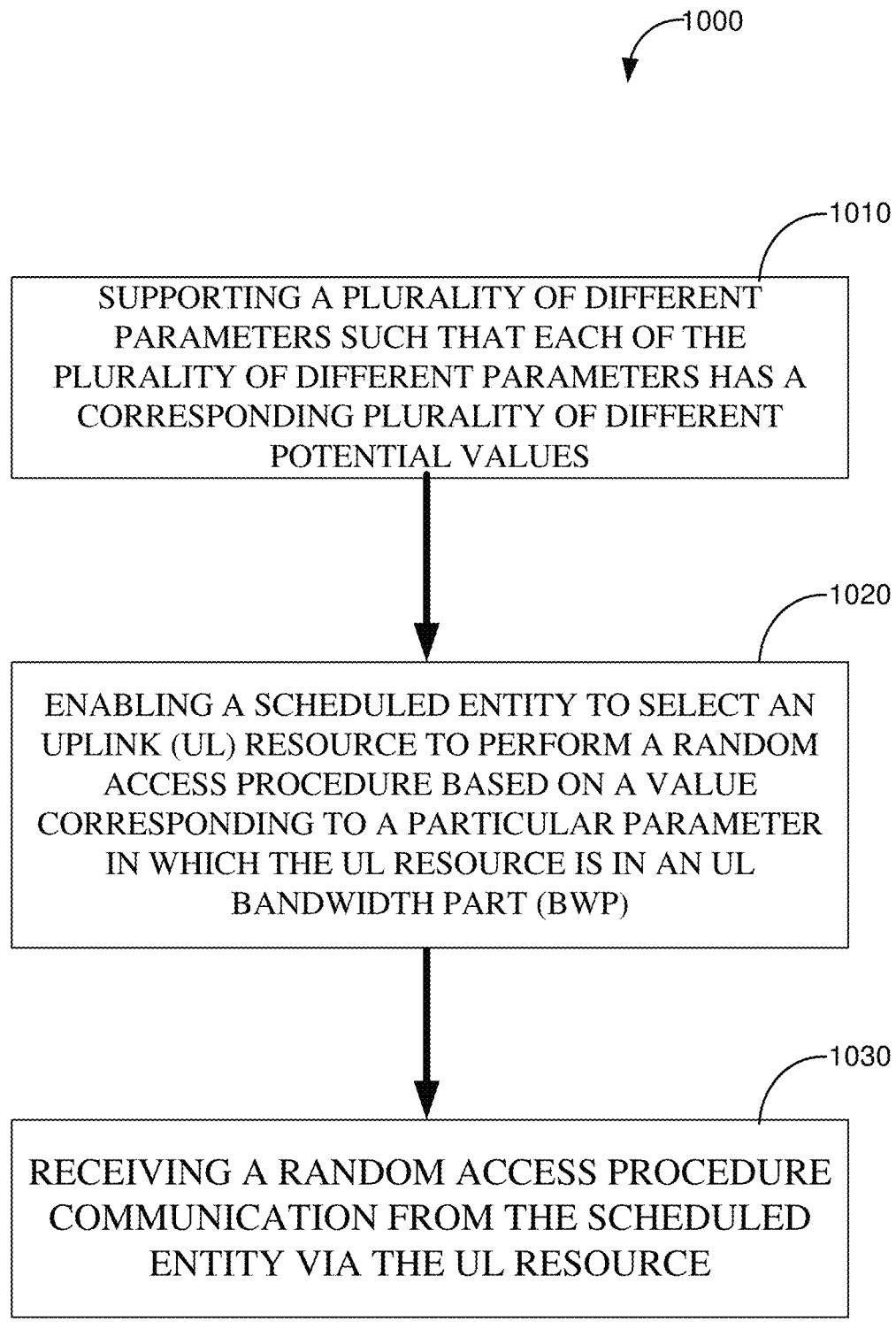
FIG. 10 is a flow chart illustrating an exemplary scheduling entity process that facilitates a random access procedure performed by a scheduled entity according to some aspects of the disclosure.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein and utilizing, for example, the processes and/or algorithms described in relation to FIG. 10.

Figure 11:
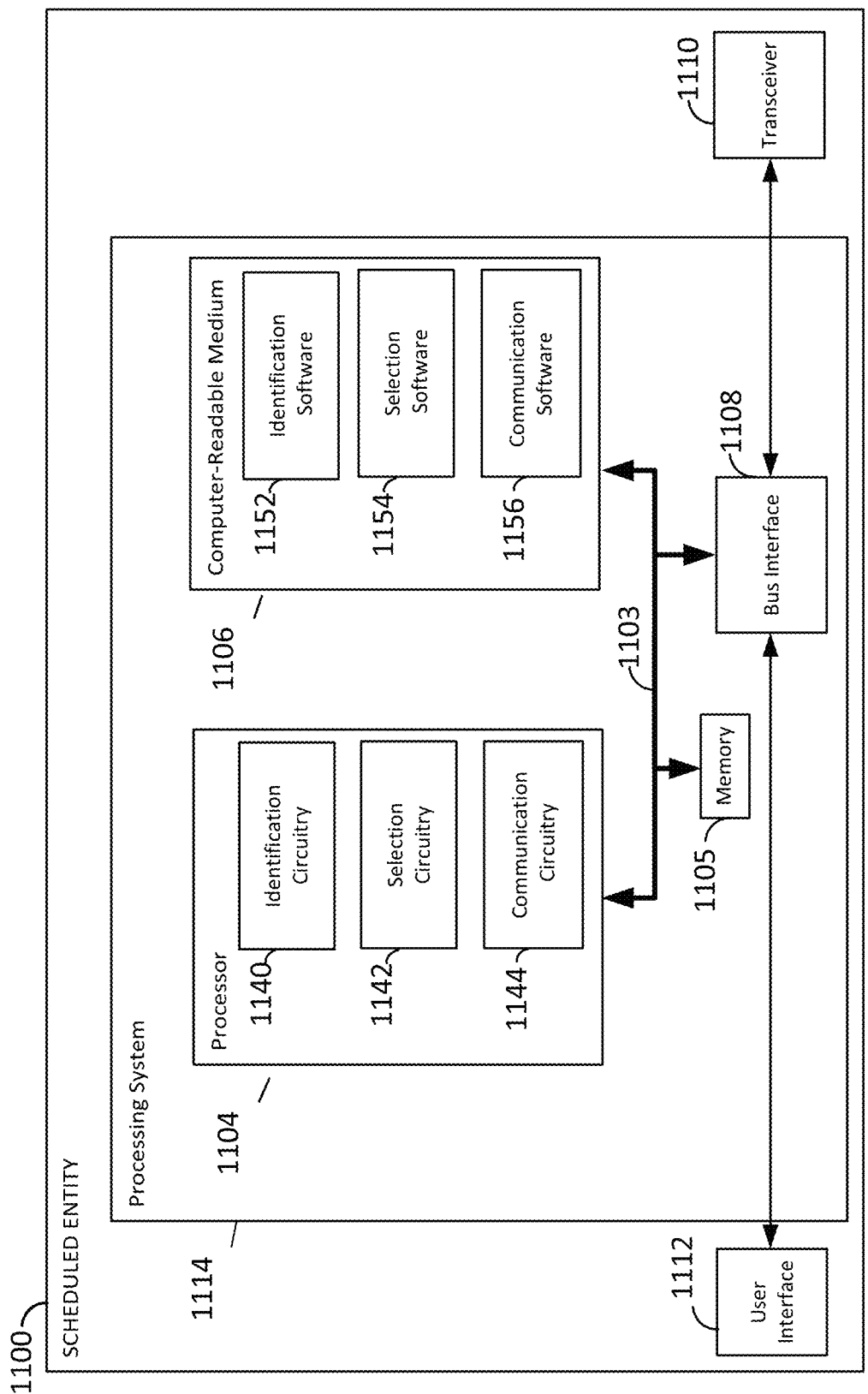
FIG. 11 is a block diagram illustrating an example of a hardware implementation for a scheduled entity employing a processing system in accordance with aspects disclosed herein.

In a particular implementation, it is contemplated that the scheduling entity 800 may configure a scheduled entity to select which type of UL resource to utilize when performing a random access procedure according to particular conditions specified by the scheduling entity 800 (e.g., which parameters and corresponding values). Referring next to FIG. 11, exemplary sub-components of enabling circuitry 842 and enabling software 854 are provided, which facilitate determining such conditions. As illustrated, enabling circuitry 842 may comprise multiple initial sub-circuitry 900, single active sub-circuitry 910, and supplemental sub-circuitry 920; whereas enabling software 854 may comprise multiple initial instructions 905, single active instructions 915, and supplemental instructions 925. Here, it is contemplated that multiple initial sub-circuitry 900 and/or multiple initial instructions 905 are configured to determine particular conditions in which the scheduled entity shall utilize an initial UL BWP selected from a plurality of initial BWPs in a multiple initial UL BWP configuration. Similarly, it is contemplated that single active sub-circuitry 910 and/or single active instructions 915 are configured to determine particular conditions in which the scheduled entity shall utilize a random access transmission occasion selected from a plurality of frequency division multiplexed random access transmission occasions. And finally, it is contemplated that supplemental sub-circuitry 920 and/or supplemental instructions 925 are configured to determine particular conditions in which the scheduled entity shall utilize a supplemental UL BWP.

In FIG. 10, a flow chart is provided, which illustrates an exemplary scheduling entity process that facilitates a random access procedure performed by a scheduled entity (e.g., scheduled entity 1100) according to some aspects of the disclosure. As described below, some or all illustrated features may be omitted in a particular implementation within the scope of the present disclosure, and some illustrated features may not be required for implementation of all embodiments. In some examples, the process 1000 may be carried out by the scheduling entity 800 illustrated in FIG. 8. In some examples, the process 1000 may be carried out by any suitable apparatus or means for carrying out the functions or algorithm described below.

Process 1000 begins at block 1010 with the scheduling entity 800 supporting a plurality of different parameters such that each of the plurality of different parameters has a corresponding plurality of different potential values. Here, it is contemplated that such parameters may include any of the parameters disclosed herein (e.g., Message 1 parameters, Message 3 parameters, etc.). Process 1000 then proceeds to block 1020 where the scheduling entity 800 enables a scheduled entity (e.g., scheduled entity 1100) to select an UL resource to perform a random access procedure based on a value corresponding to a particular parameter. Process 1000 then concludes at block 1030 where the scheduling entity 800 receives a random access procedure communication from the scheduled entity (e.g., scheduled entity 1100) via the UL resource.

Exemplary Scheduled Entity

FIG. 11 is a conceptual diagram illustrating an example of a hardware implementation for an exemplary scheduled entity 1100 employing a processing system 1114. In accordance with various aspects of the disclosure, an element, or any portion of an element, or any combination of elements may be implemented with a processing system 1114 that includes one or more processors 1104. For example, the scheduled entity 1100 may be a user equipment (UE) as illustrated in any one or more of the FIGS. disclosed herein.

The processing system 1114 may be substantially the same as the processing system 814 illustrated in FIG. 8, including a bus interface 1108, a bus 1102, memory 1105, a processor 1104, and a computer-readable medium 1106. Furthermore, the scheduled entity 1100 may include a user interface 1112 and a transceiver 1110 substantially similar to those described above in FIG. 8. That is, the processor 1104, as utilized in a scheduled entity 1100, may be used to implement any one or more of the processes described below and illustrated in the various figures.

In some aspects of the disclosure, the processor 1104 may include an identification circuitry 1140 configured for various functions, including, for example, to identify a parameter (e.g., a random access procedure parameter) from a plurality of different parameters that each have a corresponding plurality of different potential values. As illustrated, the processor 1104 may also include selection circuitry 1142 configured for various functions. For instance, selection circuitry 1142 may be configured to select an uplink (UL) resource associated with a random access procedure based on a value corresponding to the random access procedure parameter. For this example, the UL resource is in an UL bandwidth part (BWP). For instance, the selection circuitry 1142 may be configured to select a random access transmission occasion outside of an active UL BWP as the UL resource (e.g., where the random access transmission occasion outside of the active UL BWP is associated with a single active UL BWP configuration). The processor 1104 may further include communication circuitry 1144 configured for various functions, including, for example, to transmit a random access procedure communication via the selected UL resource. Here, it should be appreciated that such random access procedure communication may either be an initial random access procedure communication, or a non-initial random access procedure communication (e.g., a connected mode contention-based or contention-free RACH). It should be further appreciated that, the combination of the identification circuitry 1140, the selection circuitry 1142, and the communication circuitry 1144 may be configured to implement one or more of the functions described herein.

In an aspect of the disclosure, it is contemplated that the identification circuitry 1140 may be configured to identify any of various types of parameters respectively having a corresponding plurality of different potential values. For instance, the identification circuitry 1140 may be configured to identify any of a plurality of Message 1 parameters associated with transmitting a physical random access channel (PRACH) preamble, wherein such parameters each have a corresponding plurality of different potential values (e.g., different values corresponding to a preamble format, a number of preambles, a backoff indicator, a power ramping counter, a PRACH received target power, a maximum number of PRACH transmissions, or a reference signal received power (RSRP) threshold).

In addition to Message 1 parameters, however, it should be appreciated that the identification circuitry 1140 may be configured to identify any of various other types of parameters as well. For instance, it is contemplated that the identification circuitry 1140 may be configured to identify any of a plurality of Message 3 parameters associated with establishing a radio resource control (RRC) connection, wherein such parameters each have a corresponding plurality of different potential values.

In a further aspect of the disclosure, it is contemplated that the selection circuitry 1142 may be configured to select any of various types of UL BWPs as the UL resource. For instance, in a first exemplary embodiment, the selection circuitry 1142 may be configured to select between either an initial UL BWP or an active UL BWP as the BWP for the UL resource (e.g., wherein a Message 3 parameter facilitates the selecting between the initial UL BWP the active UL BWP, and wherein the Message 3 parameter denotes at least one of a cyclic prefix or a subcarrier spacing associated with a Message 3 communication). In another exemplary embodiment, however, the selection circuitry 1142 may be configured to select between either a supplemental UL BWP or a non-supplemental UL BWP as the BWP for the UL resource (e.g., wherein a reference signal received power (RSRP) threshold corresponding to a Synchronization Signal Block (SSB) facilitates the selecting between the supplemental UL BWP and the non-supplemental UL BWP).

Various other aspects for scheduled entity 1100 are also contemplated. For instance, the identification circuitry 1140 may be configured such that the identifying of the parameter is based on information received from a network (e.g., scheduling entity 800). Alternatively, the identification circuitry 1140 may be configured such that the identifying of the parameter is based on internal information included in the scheduled entity 1100.

In another aspect of the disclosure, it is contemplated that the scheduled entity 1100 may be prohibited from using particular UL resources. Namely, it is contemplated that at least one type of scheduled entity may be barred from utilizing at least one initial UL BWP in a multiple initial UL BWP configuration or at least one random access transmission occasion in a single active UL BWP configuration. Moreover, in a particular implementation, the selection circuitry 1142 may be configured to identify at least one blacklisted UL resource based on a scheduled entity type (e.g., eMTC, nb-IoT, etc.), wherein the at least one UL blacklisted resource is at least one initial UL BWP in a multiple initial UL BWP configuration or at least one random access transmission occasion in a single active UL BWP configuration.

Similar to processor 804, processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. Similar to computer-readable medium 806, computer-readable medium 1106 may be a non-transitory computer-readable medium comprising characteristics that are substantially similar. The computer-readable medium 1106 may reside in the processing system 1114, external to the processing system 1114, or distributed across multiple entities including the processing system 1114. It should also be appreciated that, similar to computer-readable medium 806, computer-readable medium 1106 may be embodied in a computer program product comprising characteristics that are substantially similar In one or more examples, the computer-readable storage medium 1106 may include identification software 1152 configured for various functions, including, for example, to identify a parameter from a plurality of different parameters that each have a corresponding plurality of different potential values. As illustrated, the computer-readable medium 1106 may also include selection software 1154 configured for various functions. For instance, selection software 1154 may be configured to select an UL resource associated with a random access procedure based on a value corresponding to the parameter. For this example, the UL resource is in an UL BWP. The computer-readable medium 1106 may further include communication software 1156 configured for various functions, including, for example, to transmit a random access procedure communication via the selected UL resource. Here, it should be appreciated that such random access procedure communication may either be an initial random access procedure communication, or a non-initial random access procedure communication (e.g., a connected mode contention-based or contention-free RACH). It should be further appreciated that, the combination of the identification software 1152, the selection software 1154, and the communication software 1156 may be configured to implement one or more of the functions described herein.

In a particular configuration, it is also contemplated that the scheduled entity 1100 includes means for identifying a parameter from a plurality of different parameters having a plurality of different potential values; means for selecting an UL resource based on a value associated with the parameter; and means for transmitting a random access procedure communication via the selected UL resource. In one aspect, the aforementioned means may be the processor(s) 1104 configured to perform the functions recited by the aforementioned means. In another aspect, the aforementioned means may be a circuit or any apparatus configured to perform the functions recited by the aforementioned means. Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described herein, and utilizing, for example, the processes and/or algorithms described in relation to FIG. 13.

Figure 12:
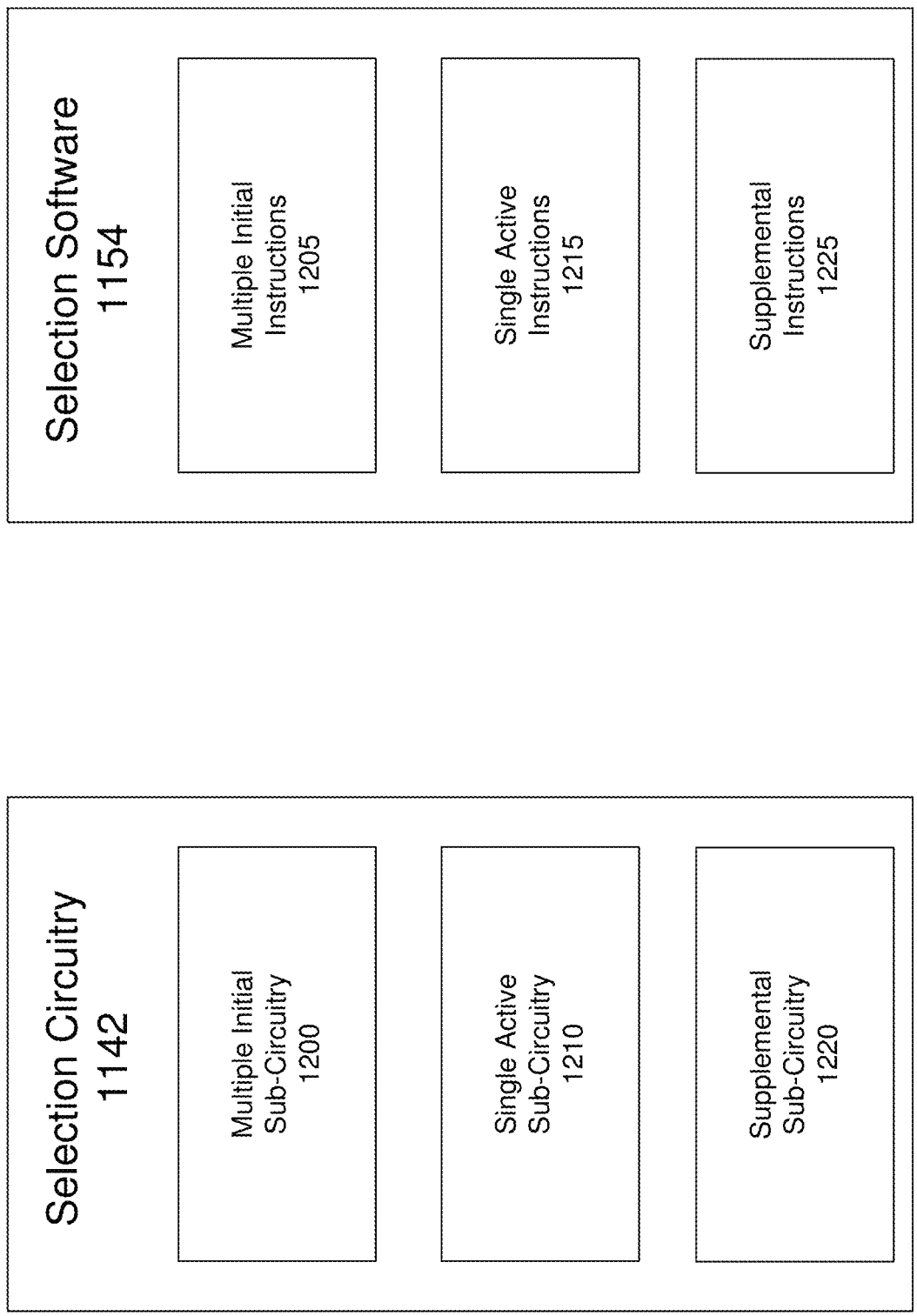
FIG. 12 is a block diagram illustrating exemplary subcomponents corresponding to the scheduled entity illustrated in FIG. 11.

In a particular implementation, it is contemplated that the scheduled entity 1100 may be configured to select which type of UL resource to utilize when performing a random access procedure according to particular conditions (e.g., which parameters and corresponding values). Referring next to FIG. 12, exemplary sub-components of selection circuitry 1142 and selection software 1154 are provided, which facilitate determining such conditions. As illustrated, selection circuitry 1142 may comprise multiple initial sub-circuitry 1200, single active sub-circuitry 1210, and supplemental sub-circuitry 1220; whereas selection software 1154 may comprise multiple initial instructions 1205, single active instructions 1215, and supplemental instructions 1225. Here, it is contemplated that multiple initial sub-circuitry 1200 and/or multiple initial instructions 1205 are configured to determine particular conditions in which the scheduled entity 1100 shall utilize an initial UL BWP selected from a plurality of initial BWPs in a multiple initial UL BWP configuration. Similarly, it is contemplated that single active sub-circuitry 1210 and/or single active instructions 1215 are configured to determine particular conditions in which the scheduled entity 1100 shall utilize a random access transmission occasion selected from a plurality of frequency division multiplexed random access transmission occasions (e.g., where the random access transmission occasion selected from the plurality of frequency division multiplexed random access transmission occasions are associated with a single active UL BWP configuration). And finally, it is contemplated that supplemental sub-circuitry 1220 and/or supplemental instructions 1225 are configured to determine particular conditions in which the scheduled entity 1100 shall utilize a supplemental UL BWP.

In FIG. 13, a flow chart is provided, which illustrates an exemplary scheduled entity process for performing a random access procedure according to some aspects of the disclosure. As described below, some or all illustrated features may be omitted in a particular implementation within the scope of the present disclosure, and some illustrated features may not be required for implementation of all embodiments. In some examples, the process 1300 may be carried out by the scheduled entity 1100 illustrated in FIG. 11. In some examples, the process 1300 may be carried out by any suitable apparatus or means for carrying out the functions or algorithm described below.

Process 1300 begins at block 1310 with the identifying of a parameter from a plurality of different parameters that each have a corresponding plurality of different potential values. Once the parameter is identified at block 1310, process 1300 proceeds to block 1320 where the scheduled entity 1100 selects an UL resource based on a value associated with the particular parameter identified at block 1310. Here, it is contemplated that the UL resource is in an UL BWP. Process 1300 then concludes at block 1330 where a random access procedure communication is transmitted via the selected UL resource.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects.

For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
    identifying a parameter from a plurality of different parameters, wherein each of the plurality of different parameters has one of:
        a corresponding plurality of different first potential values across multiple initial uplink (UL) bandwidth parts (BWPs) in a multiple initial UL BWP configuration; or
        a corresponding plurality of different second potential values across multiple frequency division multiplexed random access transmission occasions in a single active UL BWP configuration;
    selecting an UL resource associated with a random access procedure based on a value corresponding to the parameter; and
    transmitting a random access procedure communication via the selected UL resource.

2. The method of claim 1, wherein the random access procedure communication is an initial random access procedure communication.

3. The method of claim 1, wherein the parameter is a random access procedure parameter.

4. The method of claim 1, wherein the parameter is a Message 1 parameter associated with transmitting a physical random access channel (PRACH) preamble.

5. The method of claim 4, wherein the parameter is one of a preamble format, a number of preambles, a backoff indicator, a power ramping counter, a PRACH received target power, a maximum number of PRACH transmissions, or a reference signal received power (RSRP) threshold.

6. The method of claim 1, wherein the selecting comprises selecting between either a first UL BWP of the multiple initial UL BWPs in the multiple initial UL BWP configuration or a single active UL BWP in the single active UL BWP configuration.

7. The method of claim 6, wherein the parameter is a Message 3 parameter associated with establishing a radio resource control (RRC) connection, and wherein the Message 3 parameter facilitates the selecting between the first UL BWP of the multiple initial UL BWPs or the single active UL BWP.

8. The method of claim 7, wherein the Message 3 parameter denotes at least one of a cyclic prefix or a subcarrier spacing associated with a Message 3 communication.

9. The method of claim 1, wherein the selecting comprises selecting between either a supplemental UL BWP or a non-supplemental UL BWP.

10. The method of claim 9, further comprising using a reference signal received power (RSRP) threshold corresponding to a Synchronization Signal Block (SSB) to facilitate the selecting between the supplemental UL BWP and the non-supplemental UL BWP.

11. The method of claim 1, further comprising barring at least one type of scheduled entity from utilizing at least one initial UL BWP in the multiple initial UL BWP configuration or at least one random access transmission occasion in the single active UL BWP configuration.

12. The method of claim 1, wherein the selecting of the UL resource comprises one of:
    in the multiple initial UL BWP configuration, selecting a first UL BWP of the multiple initial UL BWPs when the value corresponds to the first of the multiple initial UL BWPs, and selecting a second UL BWP of the multiple initial UL BWPs when the value corresponds to the second of the multiple initial UL BWPs; or
    in the single active UL BWP configuration, selecting a first transmission occasion within a single active UL BWP when the value corresponds to the first transmission occasion within the single active UL BWP, and selecting a second transmission occasion outside of the single active UL BWP when the value corresponds to the second transmission occasion outside of the single active UL BWP.

13. A scheduled entity for wireless communication comprising:
an identification circuitry configured to identify a parameter from a plurality of different parameters, wherein each of the plurality of different parameters has one of:
a corresponding plurality of different first potential values across multiple initial uplink (UL) bandwidth parts (BWPs) in a multiple initial UL BWP configuration; or
a corresponding plurality of different second potential values across multiple frequency division multiplexed random access transmission occasions in a single active UL BWP configuration;
a selection circuitry configured to select an UL resource associated with a random access procedure based on a value corresponding to the parameter; and
a communication circuitry configured to transmit a random access procedure communication via the selected UL resource.

14. The scheduled entity of claim 13, wherein the selection circuitry is configured to select the UL resource according to one of:
in the multiple initial UL BWP configuration, selecting a first UL BWP of the multiple initial UL BWPs when the value corresponds to the first of the multiple initial UL BWPs, and selecting a second UL BWP of the multiple initial UL BWPs when the value corresponds to the second of the multiple initial UL BWPs; or
in the single active UL BWP configuration, selecting a first transmission occasion within a single active UL BWP when the value corresponds to the first transmission occasion within the single active UL BWP, and selecting a second transmission occasion outside of the single active UL BWP when the value corresponds to the second transmission occasion outside of the single active UL BWP.

15. A method of wireless communication, comprising:
supporting a plurality of different parameters, wherein each of the plurality of different parameters has one of:
a corresponding plurality of different first potential values across multiple initial uplink (UL) bandwidth parts (BWPs) in a multiple initial UL BWP configuration; or
a corresponding plurality of different second potential values across multiple frequency division multiplexed random access transmission occasions in a single active UL BWP configuration;
enabling at least one scheduled entity to select an UL resource to perform a random access procedure, wherein the enabling comprises enabling the at least one scheduled entity to select the UL resource is-based on a value corresponding to a particular one of the plurality of different parameters; and
receiving a random access procedure communication from the at least one scheduled entity, the random access procedure communication received via the UL resource.

16. The method of claim 15, wherein the random access procedure communication is an initial random access procedure communication.

17. The method of claim 15, wherein the particular one of the plurality of different parameters is a random access procedure parameter.

18. The method of claim 15, wherein the particular one of the plurality of different parameters is a Message 1 parameter associated with transmitting a physical random access channel (PRACH) preamble.

19. The method of claim 18, wherein the particular one of the plurality of different parameters is one of a preamble format, a number of preambles, a backoff indicator, a power ramping counter, a PRACH received target power, a maximum number of PRACH transmissions, or a reference signal received power (RSRP) threshold.

20. The method of claim 15, wherein the enabling comprises enabling the at least one scheduled entity to select between either a first UL BWP of the multiple initial UL BWPs in the multiple initial UL BWP configuration or a single active UL BWP in the single active UL BWP configuration.

21. The method of claim 20, wherein the particular one of the plurality of different parameters is a Message 3 parameter associated with establishing a radio resource control (RRC) connection, and wherein the Message 3 parameter facilitates a selection between the first UL BWP of the multiple initial UL BWPs or the single active UL BWP.

22. The method of claim 21, wherein the Message 3 parameter denotes at least one of a cyclic prefix or a subcarrier spacing associated with a Message 3 communication.

23. The method of claim 15, wherein the enabling comprises enabling the at least one scheduled entity to select between either a supplemental UL BWP or a non-supplemental UL BWP.

24. The method of claim 23, wherein the enabling further comprises enabling the at least one scheduled entity to use a reference signal received power (RSRP) threshold corresponding to a Synchronization Signal Block (SSB) to facilitate a selection between the supplemental UL BWP and the non-supplemental UL BWP.

25. The method of claim 15, wherein the supporting comprises grouping a first UL BWP according to a first set of parameters, and grouping a second UL BWP according to a second set of parameters different from the first set of parameters.

26. The method of claim 15, wherein the supporting comprises assigning a physical random access channel (PRACH) mask index to a subset of a plurality of frequency division multiplexed random access transmission occasions, and wherein the supporting further comprises reserving a remainder of the plurality of frequency division multiplexed random access transmission occasions for a network.

27. The method of claim 15, further comprising barring at least one type of scheduled entity from utilizing at least one initial UL BWP in the multiple initial UL BWP configuration or at least one random access transmission occasion in the single active UL BWP configuration.

28. The method of claim 15, wherein the enabling of the at least one scheduled entity to select the UL resource is in accordance with one of:
in the multiple initial UL BWP configuration, selecting a first UL BWP of the multiple initial UL BWPs when the value corresponds to the first of the multiple initial UL BWPs, and selecting a second UL BWP of the multiple initial UL BWPs when the value corresponds to the second of the multiple initial UL BWPs; or
in the single active UL BWP configuration, selecting a first transmission occasion within a single active UL BWP when the value corresponds to the first transmission occasion within the single active UL BWP, and selecting a second transmission occasion outside of the single active UL BWP when the value corresponds to the second transmission occasion outside of the single active UL BWP.

29. A scheduling entity for wireless communication comprising:
- a parameter circuitry configured to support a plurality of different parameters, wherein each of the plurality of different parameters has one of:
  - a corresponding plurality of different first potential values across multiple initial uplink (UL) bandwidth parts (BWPs) in a multiple initial UL BWP configuration; or
  - a corresponding plurality of different second potential values across multiple frequency division multiplexed random access transmission occasions in a single active UL BWP configuration;
- an enabling circuitry configured to enable at least one scheduled entity to select an UL resource to perform a random access procedure, wherein the enabling circuitry is configured to enable the at least one scheduled entity to select the UL resource based on a value corresponding to a particular one of the plurality of different parameters; and
- a communication circuitry configured to receive a random access procedure communication from the at least one scheduled entity, the random access procedure communication received via the UL resource.

30. The scheduling entity of claim 29, wherein the enabling circuitry is configured to enable the at least one scheduled entity to select the UL resource in accordance with one of:
- in the multiple initial UL BWP configuration, selecting a first UL BWP of the multiple initial UL BWPs when the value corresponds to the first of the multiple initial UL BWPs, and selecting a second UL BWP of the multiple initial UL BWPs when the value corresponds to the second of the multiple initial UL BWPs; or
- in the single active UL BWP configuration, selecting a first transmission occasion within a single active UL BWP when the value corresponds to the first transmission occasion within the single active UL BWP, and selecting a second transmission occasion outside of the single active UL BWP when the value corresponds to the second transmission occasion outside of the single active UL BWP.

* * * * *